United States Patent
Schreiber et al.

(10) Patent No.: US 9,964,117 B2
(45) Date of Patent: May 8, 2018

(54) COMPRESSOR BLADE OF A GAS TURBINE

(71) Applicant: Rolls-Royce Deutschland Ltd & Co KG, Blankenfelde-Mahlow (DE)

(72) Inventors: Karl Schreiber, Am Mellensee (DE); Werner Hufenbach, Dresden (DE); Albert Langkamp, Dresden (DE); Tino Wollmann, Dresden (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 216 days.

(21) Appl. No.: 14/972,810

(22) Filed: Dec. 17, 2015

(65) Prior Publication Data
US 2016/0177969 A1   Jun. 23, 2016

(30) Foreign Application Priority Data
Dec. 19, 2014  (DE) .................. 10 2014 226 700

(51) Int. Cl.
| | | |
|---|---|---|
| F01D 5/14 | (2006.01) | |
| F04D 29/38 | (2006.01) | |
| F01D 5/28 | (2006.01) | |
| F01D 21/04 | (2006.01) | |
| F02C 7/05 | (2006.01) | |

(Continued)

(52) U.S. Cl.
CPC ........... F04D 29/388 (2013.01); F01D 5/147 (2013.01); F01D 5/282 (2013.01); F01D 21/045 (2013.01); F02C 7/05 (2013.01); F04D 19/002 (2013.01); F04D 29/023 (2013.01); F04D 29/324 (2013.01); F04D 29/542 (2013.01)

(58) Field of Classification Search
CPC ........ F04D 29/388; F01D 5/147; F01D 5/282; F02C 7/05
USPC ......................................................... 416/224
See application file for complete search history.

(56) References Cited

U.S. PATENT DOCUMENTS

| | | |
|---|---|---|
| 3,628,890 A | 12/1971 | Sayre et al. |
| 4,108,572 A | 8/1978 | Platt |

(Continued)

FOREIGN PATENT DOCUMENTS

| | | |
|---|---|---|
| CA | 2630951 A1 | 1/2009 |
| DE | 102005061673 A1 | 7/2007 |

(Continued)

OTHER PUBLICATIONS

German Search Report dated Oct. 8, 2015 for related German Application No. DE 10 2014 226 700.5.

(Continued)

*Primary Examiner* — Richard Edgar
*Assistant Examiner* — Michael Sehn
(74) *Attorney, Agent, or Firm* — Shuttleworth & Ingersoll, PLC; Timothy J. Klima

(57) ABSTRACT

The present invention relates to a compressor blade of a gas turbine having an airfoil and a blade root, said blade root and airfoil being made in one piece from a fiber-composite material, as well as a leading edge protector made from a sheet metal material, characterized in that the airfoil is provided with a radial groove extending substantially over the entire length of the airfoil and that the leading edge protector is detachably clamped onto the airfoil and is fixed with a sheet metal flange in the radial groove of the airfoil.

17 Claims, 2 Drawing Sheets

Figure 1:
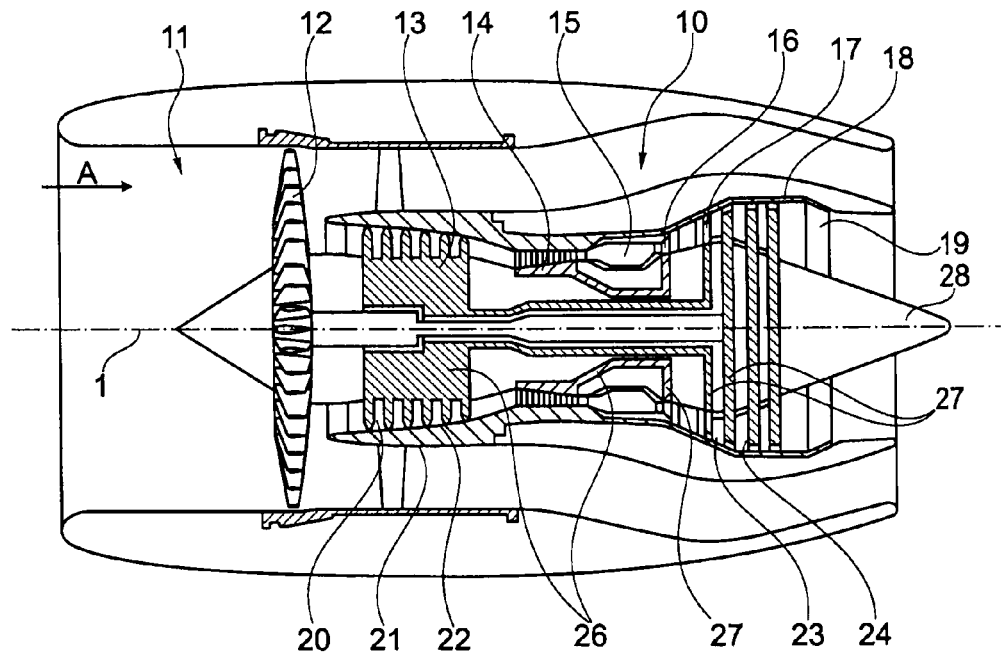

(51) Int. Cl.
*F04D 19/00* (2006.01)
*F04D 29/02* (2006.01)
*F04D 29/32* (2006.01)
*F04D 29/54* (2006.01)

(56) References Cited

U.S. PATENT DOCUMENTS

| | | | |
|---|---|---|---|
| 4,895,491 A * | 1/1990 | Cross | F04D 29/388 244/123.9 |
| 5,908,285 A | 6/1999 | Graff | |
| 7,510,778 B2 | 3/2009 | Bernard et al. | |
| 7,744,346 B2 | 6/2010 | Schreiber et al. | |
| 8,137,073 B2 | 3/2012 | Giusti et al. | |
| 9,664,201 B2 * | 5/2017 | Dudon | F04D 29/38 |
| 2011/0194941 A1 * | 8/2011 | Parkin | B29C 70/48 416/224 |
| 2014/0030107 A1 | 1/2014 | Schreiber | |
| 2014/0193271 A1 | 7/2014 | Dudon et al. | |
| 2015/0026980 A1 | 1/2015 | Tellier et al. | |

FOREIGN PATENT DOCUMENTS

| | | |
|---|---|---|
| DE | 102012015136 A1 | 1/2014 |
| EP | 2692988 A2 | 2/2014 |
| FR | 2988786 A1 | 10/2013 |
| WO | WO2013021141 A1 | 2/2013 |

OTHER PUBLICATIONS

European Search Report dated Jun. 21, 2016 for counterpart European Application No. 15198117.2.

* cited by examiner

COMPRESSOR BLADE OF A GAS TURBINE

This application claims priority to German Patent Application 102014226700.5 filed Dec. 19, 2014, the entirety of which is incorporated by reference herein.

This invention relates to a compressor blade of a gas turbine in accordance with the features of the generic part of claim 1.

In detail, the invention relates to a compressor blade having an airfoil and a blade root, said blade root and airfoil being made in one piece from a fiber-composite material. Furthermore, the compressor blade in accordance with the present invention, which can be used for a high-pressure compressor or an intermediate-pressure compressor of a gas turbine, has a leading edge protector made from a sheet metal material. The compressor blade in accordance with the invention can be designed both as a stator vane and as a rotor blade.

The state of the art shows compressor blades which are made from metal. With metallic blades of this type, it is not required to protect the leading edge or inflow edge additionally.

Using fiber-plastic composites for manufacturing compressor blades and using carbon fiber-reinforced plastics results in the necessity of additionally protecting the leading edge area or the inflow edge area. Compared with fan blades, the result in compressor blades is that larger particles such as stones or larger sand grains are deflected from the fan blades after they have impacted these. Smaller and finer particles, however, pass through the fan into the compressor and lead to damage of the compressor blades due to erosion. While compressor blades made from fiber-composite material can meet the mechanical requirements and can also be used in a higher temperature range of up to 300° C., such compressor blades made from fiber-composite material are, however, not resistant to erosive stresses: instead there is considerable wear due to particle erosion, necessitating the replacement of compressor blades. This entails dismantling of the gas turbine to permit access to the compressor.

A turbomachine rotor blade made from a composite material is known from U.S. Pat. No. 4,108,572 A, in which a titanium sheet is firmly connected to the composite material. The titanium sheet on the one hand helps to increase the strength of the blade and on the other hand prevents damage due to foreign bodies.

U.S. Pat. No. 3,628,890 A shows a compressor blade made from a fiber-composite material combined with a fixed inflow edge element which is connected in one piece to a blade root and is made from a metallic material. The inflow edge element thus forms, seen in the direction of flow, a first area of the blade adjoined by the remaining blade area made from the fiber-composite material.

Both the aforementioned designs make it necessary to replace eroded or damaged compressor blades by dismantling the gas turbine.

The state of the art shows further blade designs, where the leading edges of the blades are provided with a leading edge protector made from metal, which is however firmly connected to the blade. Reference is made in this connection to U.S. Pat. No. 7,510,778 B2, U.S. Pat. No. 8,137,073 B2, U.S. Pat. No. 5,908,285 A, CA 2,630,951 A1 and WO 2013/021141 A1.

The result is therefore that all designs known from the state of the art have a leading edge protector which is firmly connected to the compressor blade and cannot be replaced separately. The leading edge protector is connected using bonded connections or by means of mechanical connectors, for example, rivets or bolts. These connections have, however, the disadvantage that they frequently fail to satisfy long-term requirements and can only be inspected with great effort.

The object underlying the present invention is to provide a compressor blade of a gas turbine of the type mentioned at the beginning, which while being simply designed and easily and cost-effectively producible has an effective leading edge protector that can be replaced when the gas turbine is not dismantled.

It is a particular object of the present invention to provide a solution to the above problems by a combination of the features disclosed herein. Further advantageous embodiments will become apparent from the present disclosure.

It is thus provided in accordance with the invention that the airfoil has a radial groove extending substantially over the entire length of the airfoil and that the leading edge protector is detachably clamped onto the airfoil and is fixed with a sheet metal flange in the radial groove of the airfoil.

The solution in accordance with the invention thus provides that a leading edge protector formed out of sheet metal is elastically clamped onto the compressor blade made from a fiber-composite material and is fixed by the radial groove of the compressor blade. As the leading edge protector is clamped or clipped in place, it is possible to replace it without dismantling the actual compressor blade. This replacement is in particular possible in the non-dismantled "on wing" state of the gas turbine. This permits inexpensive and rapid replacement of eroded or worn leading edge protector elements. In addition to simple and easy replaceability of the leading edge protector, a further advantage is also the easy fittability, since the leading edge protector is only fitted on and mechanically anchored, but does not have to be fastened to the compressor blade by means of complex joining methods. As a result, neither bonded connections nor riveted/bolted connections are necessary in accordance with the invention for mounting the leading edge protector.

In a particularly favourable development of the invention it is provided that the radial groove is designed on the blade pressure side of the airfoil. Since the blade pressure side is aerodynamically less sensitive, the flow behaviour along the compressor blade is not negatively affected.

To clamp or clip it into place, the leading edge protector in accordance with the invention is only elastically deformed, so that mechanical damage is ruled out.

To optimize the flow along the compressor blade, it is provided that a leading edge area of the compressor blade in which the leading edge protector in accordance with the invention is fitted has a recess extending in the axial direction. The leading edge protector is inserted into this recess when it is clamped on, so that an undisrupted outer contour of the compressor blade with a smooth surface is obtained.

In the case of stator vanes, the described clamping of the leading edge protector is sufficient to fasten it in place. In the case of rotor blades, however, high centrifugal forces of 40,000 to 50,000 G result. It is therefore particularly advantageous when the leading edge protector in accordance with the invention is designed such that it extends into the blade root in order to secure it radially. This makes it possible to anchor the leading edge protector in the area of the blade root on the latter. The leading edge protector can encompass the blade root, but it is also possible to provide one or more grooves in the blade root in which the leading edge protector engages, in this way clamping it and securing it against radial slippage. This embodiment additionally results in vibration damping both of the leading edge protector and of the entire compressor blade.

A further advantage of this design is the positive connection between the composite blade and the leading edge protector due to the fact that when aerodynamic vibration of the blade is excited, a relative movement between the leading edge and the composite blade results, leading to considerable vibration damping of the system due to the resultant friction.

Figure 2:
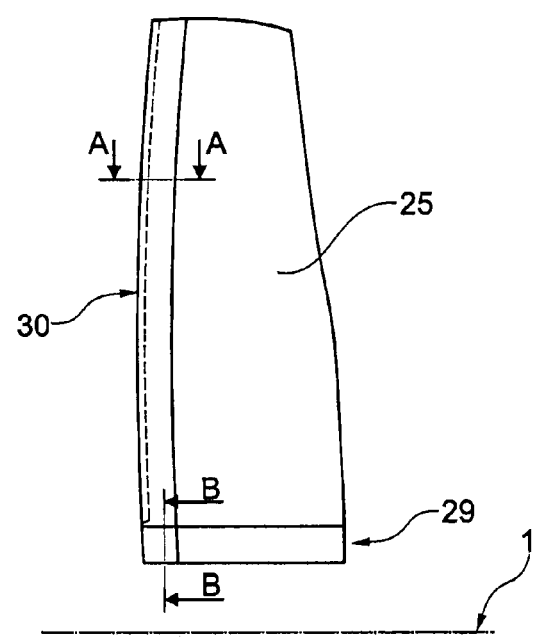
Figure 3:
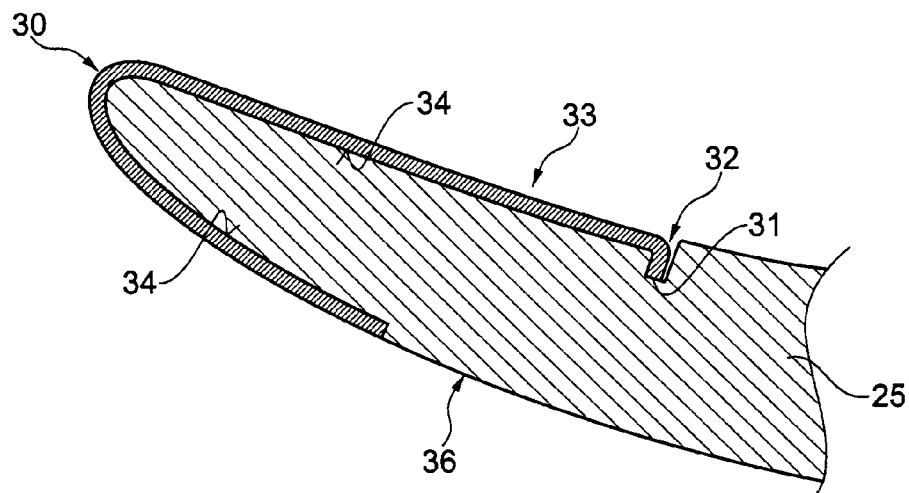
Figure 4:
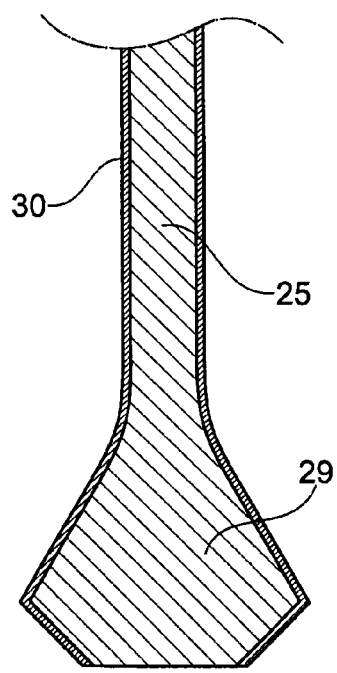
Figure 5:
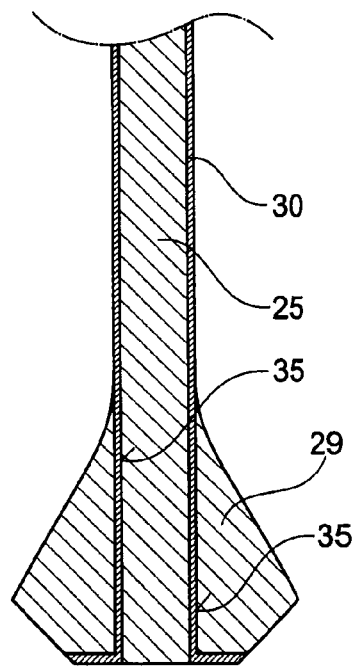

The present invention is described in the following in light of the accompanying drawing on the basis of an exemplary embodiment. In the drawing, FIG. 1 shows a schematic representation of a gas-turbine engine in accordance with the present invention, FIG. 2 shows a simplified side view of an exemplary embodiment with a compressor blade in accordance with the present invention, FIG. 3 shows a sectional view along line A-A of FIG. 2, FIG. 4 shows a detailed sectional view along line B-B of FIG. 2, and FIG. 5 shows a further exemplary embodiment, in sectional view, by analogy with FIG. 4.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a simplified side view of a compressor blade in accordance with the invention. It includes an airfoil 25, which is made from a fiber-composite material or an organic composite material. The airfoil 25 is connected in one piece to a blade root 29 which is anchored positively, for example in a compressor disk, as is known from the state of the art.

FIG. 2 furthermore shows that a leading edge protector 30 is arranged in the inflow area of the airfoil 25 and protects the airfoil 25 from damage caused by fine particles or the like.

FIG. 3 shows the leading edge protector made from a sheet metal material in a sectional view. Sheet metal material is understood here as a material of larger dimensions with a consistent thickness.

As is shown by the illustration in FIG. 3, the airfoil 25 has a radial groove 31 extending over the entire length of the airfoil 25, inside which is positioned a flange of the sheet metal 32 formed on the leading edge protector 30 and extending in the radial direction. This positive anchoring secures the clamped leading edge protector 30 and prevents it coming loose from the airfoil 25.

FIG. 3 furthermore shows that the airfoil 25 is provided in the inflow area, both on the blade pressure side 33 and on the blade suction side 36, with a recess 34 dimensioned to match the shape of the leading edge protector 30. The result after clamping and clipping in place of the leading edge protector 30 is a smooth and flow-optimized surface of the compressor blade.

The radial groove 31 is provided on the blade pressure side 33, as the latter is aerodynamically less sensitive and accordingly not weakened or impaired in its flow characteristics by the radial groove 31.

FIGS. 4 and 5 each show sectional views along line B-B of FIG. 2. It can be seen here in particular that the blade root 29 is designed thicker or wider, to be mechanically anchored in a suitably dimensioned recess of a rotor disk or of a casing area. This leads to radial securing of the entire compressor blade. To ensure that the leading edge protector is secured and does not slip even at high speeds of a compressor rotor, the leading edge protector 30 in the exemplary embodiment shown in FIG. 4 encompasses the blade root 29 and is clamped when the compressor blade is fitted. This design however also permits detachment of the leading edge protector from the compressor blade 25 and in particular from the blade root 29, in order to replace the leading edge protector without having to dismantle the entire compressor blade.

In the exemplary embodiment shown in FIG. 5, the blade root 29 is provided over part of its axial length with two grooves 35, into which a root area of the leading edge protector 30 can be inserted. This too ensures radial securing of the leading edge protector, while at the same time the leading edge protector can be detached for dismantling without having to dismantle the compressor blade itself.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Airfoil
26 Compressor drum or disk
27 Turbine rotor hub
28 Exhaust cone
29 Blade root
30 Leading edge protector
31 Radial groove
32 Sheet metal flange
33 Blade pressure side
34 Recess
35 Groove
36 Blade suction side

What is claimed is:

1. A compressor blade of a gas turbine, comprising:
an airfoil;
a blade root, the blade root and the airfoil being made in one piece from a fiber-composite material;
a leading edge protector made from a sheet metal material and including an end flange;
wherein the airfoil includes a substantially radial groove on a pressure side of the airfoil extending substantially over an entire length of the airfoil;
wherein the leading edge protector is detachably clamped onto the airfoil and is axially fixed with the end flange positioned in the radial groove of the airfoil;
wherein the blade root includes a radially inwardly facing surface;
wherein the leading edge protector extends into the blade root and engages the radially inwardly facing surface to radially secure the leading edge protector.

2. The compressor blade in accordance with claim 1, wherein the leading edge protector is elastically deformable for clamping into place over the airfoil.

3. The compressor blade in accordance with claim 2, wherein a leading edge area of the airfoil includes a recess extending in a radial direction to receive leading edge protector.

4. The compressor blade in accordance with claim 3, wherein the leading edge protector encompasses the blade root.

5. The compressor blade in accordance with claim 3, wherein blade root includes a groove and the leading edge protector is arranged in the groove of the blade root.

6. The compressor blade in accordance with claim 1, wherein the compressor blade is a stator vane.

7. The compressor blade in accordance with claim 1, wherein the compressor blade is a rotor blade.

8. The compressor blade in accordance with claim 1, wherein the compressor blade is a high-pressure compressor blade or an intermediate-pressure compressor blade.

9. The compressor blade in accordance with claim 1, wherein the sheet metal is made from a titanium alloy.

10. The compressor blade in accordance with claim 1, wherein the sheet metal is made from stainless steel.

11. The compressor blade in accordance with claim 1, wherein the sheet metal is made from a nickel-based material.

12. The compressor blade in accordance with claim 1, wherein a leading edge area of the airfoil includes a recess extending in a radial direction to receive the leading edge protector.

13. The compressor blade in accordance with claim 12, wherein the leading edge protector encompasses the blade root.

14. The compressor blade in accordance with claim 12, wherein the blade root includes a groove and the leading edge protector is arranged in the groove of the blade root.

15. The compressor blade in accordance with claim 1, wherein the leading edge protector encompasses the blade root.

16. The compressor blade in accordance with claim 15, wherein the blade root includes a groove and the leading edge protector is arranged in the groove of the blade root.

17. The compressor blade in accordance with claim 1, wherein the blade root includes a groove and the leading edge protector is arranged in the groove of the blade root.

* * * * *